INVENTORS
Anthony A. Berlinsky
William T. Fay
Martin J. Brennan
BY Alvin J. Englert
AGENT

3,264,739
APPARATUS FOR MEASURING AREA
Anthony A. Berlinsky, Silver Spring, Md., William T. Fay, Washington, D.C., and Martin J. Brennan, Maryland Park, Md., assignors to the United States of America as represented by the Secretary of Commerce
Filed Nov. 15, 1963, Ser. No. 324,147
1 Claim. (Cl. 33—123)

This invention relates to apparatus for measuring area, and more particularly to apparatus for measuring the areas of irregularly-shaped pieces of sheet material, such as pieces or cut-out portions of maps, graphs, aerial photographs and the like.

To measure the area of an irregularly-shaped piece of sheet material, it has heretofore been proposed that a two-dimensional array of sensing fingers, each capable of detecting the presence or absence of the sheet material, be provided and arranged to overlay the piece. By sampling the sensing fingers in sequence and registering a count for each sensing finger detecting the presence of the sheet material, the area of the piece of sheet material could be calculated in terms of the unit of area represented by each sensing finger. It has further been recognized in the art that the preferred manner of sensing the presence or absence of thin, paper-like sheet material is by electrical means. To this end, devices have been described which employ electrical probes or brushes for sensing fingers. In the utilization of these devices, the piece of thin sheet material is rendered conductive by depositing a metallic film thereon, and a common or return connection is made to the metallic film. The metallized piece is placed under the array of brushes, and a source of electric current is switched or commutated to the brushes in sequence. For each brush contacting the metallic film, a pulse of current is obtained at the return conductor. A counter is provided to register the number of pulses appearing at the return conductor, thereby providing a measure of the area of the metallized piece.

Since the requirement of providing a metallic film or layer on paper-like pieces of sheet material is time consuming and expensive, it would be highly desirable to provide an apparatus capable of electrically detecting non-conductive, i.e., insulative sheet material. Such an apparatus would be especially useful in determining or computing the areas of pieces of paper, photographic film, and the like.

An apparatus constructed in accordance with the principles of the present invention is capable of performing the desired sensing of insulative sheet material. Briefly, in the present invention the area of a piece of insulative sheet material is computed by employing the well-known calculus technique of dividing an area into parallel strips of unit width, whereby the area may be obtained as the product of the unit width and the sum of the lengths of the strips. This technique is implemented in a preferred embodiment of the invention by providing means for feeding the insulative piece beneath a row of reading brushes which normally contact a grounded roller. As the piece moves beneath the brushes, it isolates a number of brushes from ground, the number isolated at any time being proportional to the transverse dimension of the insulative piece at that time. For each brush, there is provided an associated pulse line which receives a pulse every time the insulative piece is advanced a unit distance. Each brush is connected so as to gate the pulse on its associated pulse line to a pulse counter in the event that the brush is isolated from ground. In this manner, every time the insulative piece is advanced a unit distance beneath the reading brushes, the brushes isolated from ground by the piece gate a number of pulses corresponding to the width of the piece beneath the brushes to the counter. The total count, after the paper has completely passed under the reading brushes, accordingly is a measure of the area of the piece.

In measuring the areas of certain pieces of insulative sheet material such as maps, aerial photographs, and the like, it often is desirable to exclude small enclosed portions corresponding to bodies of water and the like. In the present invention, these enclosed areas may be omitted from the measurement of the area of the piece by simply cutting out the undesired portion, whereby the undesired portion, in passing under the reading brushes, does not isolate any brushes from ground and therefore does not gate any pulses to the counter. It is further possible to omit undesired enclosed portions by painting the portions with electrically-conductive paint, provided the pulse lines associated with the reading brushes are derived from a pulse switching network of the type comprising a plurality of logical AND circuits. In such a network, the connection of two or more of the output pulse lines together, as by means of the spot of conductive paint, prevents pulses from appearing on any of the interconnected pulse lines. Thus, the spot of conductive paint in passing under the reading brushes prevents the associated pulse lines from sending pulses to the counter.

Accordingly, it is an object of this invention to provide an apparatus capable of rapidly and precisely measuring the areas of pieces of sheet material such as paper and the like.

It is another object of this invention to provide an apparatus which measures the areas of pieces of thin sheet material by high speed pulse distributing, gating, and counting techniques.

Another object is to provide an apparatus for measuring the areas of pieces of sheet material wherein undesired portions of the pieces may easily and readily be excluded from the measurements.

Still another object is to provide a pulse-type area measuring apparatus in which the pulses are checked before being counted.

Yet another object is to provide a pulse-type area measuring apparatus in which the pulse distributor and piece drive are maintained in synchronism.

These and other objects, advantages and features of the present invention will become apparent as the following description is read in conjunction with the accompanying drawings, wherein.

Figure 1:
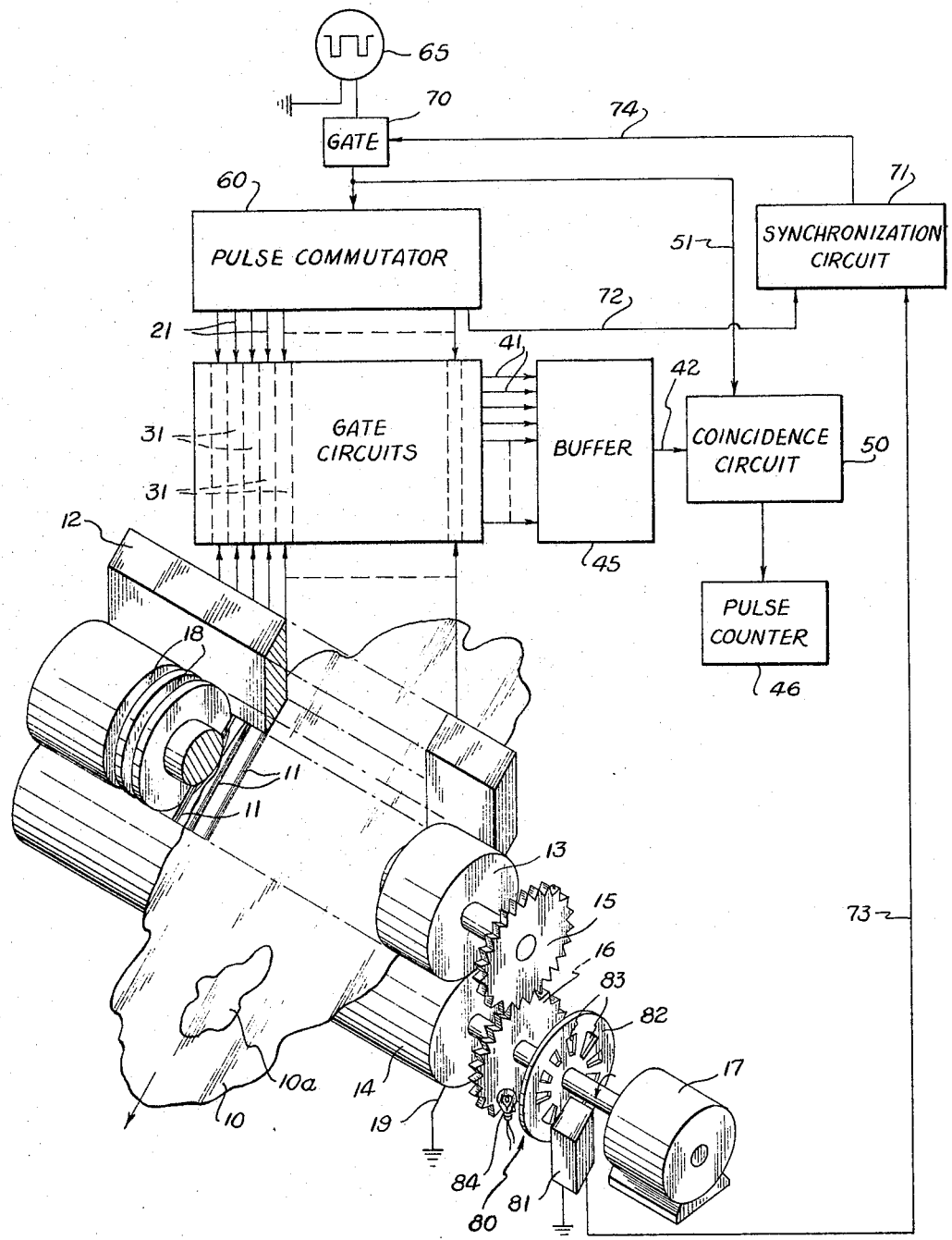
FIG. 1 shows a preferred embodiment of the present invention, the mechanical elements thereof being shown in perspective view and the electrical elements in block diagram form.

In the preferred embodiment of the present invention illustrated in FIG. 1, the reference numeral 10 designates a piece of thin, electrically-insulative sheet material such as paper, cardboard, resinous film or the like, the area of which is to be measured. The outline of the piece 10 may be regular (e.g., rectangular), but generally will be irregular, having been cut by shears or knife from a map, graph, aerial photograph or the like. In accordance with the present invention this piece 10 is fed beneath a row of uniformly-spaced electrical reading brushes 11 carried by any suitable brush block 12. The preferred mechanism for feeding the piece 10 includes a pair of rollers 13, 14 which are geared together by gears 15, 16 and driven by a suitable motor 17. The top roller 13 is constructed of insulative material and is grooved as at 18 to permit the reading brushes 11 to project a short distance beyond the crown of roller 13 and bear against the bottom roller 14. This short distance between the crowns or gripping portions of the rollers 13, 14 and the reading brushes 11 minimizes the tendency of the thin, flexible sheet material piece 10 to buckle under the resistive forces presented by the reading brushes 11. The bottom or contact roller 14 is constructed from metal and is maintained at a reference potential such as ground by a suitable brush 19.

From the foregoing it will be evident that, in the absence of the insulative piece 10, each of the uniformly space reading brushes 11 bears against the contact roller 14 and thus is held at ground potential. As the insulative piece 10 is fed beneath the reading brushes 11 by the rollers 13, 14, the piece 10 lifts various reading brushes 11 from the contact roller 14, thereby insolating those reading brushes from ground. At any moment, therefore, a count of the number of reading brushes 11 that are isolated from ground yields a direct measurement of the travelling width (the dimension transverse to the direction of travel) of the piece 10 at that time. As will readily be appreciated, if such a count is repeated every time the piece 10 progresses a unit distance past the reading brushes 11, the total count will be a measure of the area of the piece 10.

To count the number of reading brushes 11 isolated from ground by the insulative piece 10, there is provided, as shown in FIG. 1, a pulse line 21 for each reading brush 11. Each pulse line 21 and reading brush 11 are connected as inputs to a gate circuit 31, there being an output line 41 from each gate circuit 31. In operation, each gate circuit 31 allows a pulse appearing on its associated pulse line 21 to pass to the associated output line 41 only in the event that the associated reading brush 11 is isolated from ground. Thus, if each of the pulse lines 21 is pulsed in turn, the number of pulses gated to the output lines 41 will equal the number of reading brushes 11 isolated from ground by the insulative piece 10. To count the pulses on the output lines 41, the output lines 41 are connected to a common output line 42 via a suitable isolation or buffer circuit 45, and the common output line 42 is connected to a conventional pulse counter 46 via a coincidence circuit 50, the purpose of which will be described hereinafter.

Referring now to the pulse lines 21, it will be seen that the pulse lines 21 are derived from a pulse commutator 60 which is driven by a clock pulse source 65 via a gate 70 (to be described hereinafter). The function of the pulse commutator 60 is to switch or commutate each of the clock pulses in the stream of clock pulses produced by the source 65 to a separate one of the pulse lines 21. This is conventionally accomplished by feeding the clock pulses to a binary counter (not shown) having sufficient stages to count, in binary fashion, up to or beyond the number of pulse lines 21 that are desired, the binary outputs of the counter being connected to a switching network (not shown) capable of energizing a different output line for each binary count. The desired number of these different output lines are used as the pulse lines 21. For a detailed descrption of the preferred, rectifier type of pulse commutator 60, reference may be had to the article entitled, "Rectifier Networks for Multiposition Switching," by Brown et al. in the Proceedings of the IRE, February 1949, pages 139–147.

As will readily be appreciated, the frequency or repetition rate of the clock pulse source 65 and the speed of the motor 17 should be jointly selected so that each of the pulse lines 21 can be energized while the insulative piece 10 travels a desired unit distance beneath the row of reading brushes 11. In an embodiment of the present invention which was built and found to operate reliably with an average area measurement variation, arising from the random relationship of the piece with the reading brushes, well below one percent for areas in excess of thirty square inches, the speed of motor 17 was selected to feed the insulative pieces 10 at a linear speed of two and a half inches per second, which provided an area measurement within a convenient length of time. There were employed 200 reading brushes 11 uniformly spaced in a row ten inches long, so that every 0.05 inch of travelling width of the piece 10 was sampled. It was desired to measure the travelling width every 0.02 inch of travel (the "unit" distance), so as to make each reading brush 11 capable of reading in area units of 0.001 square inch. For the reasons set forth in the aforementioned article, the 200 reading brushes 11 required the use of a pulse commutator 60 having 256 (i.e., $2^8$) output lines, 56 of which were left unconnected except as will be described hereinafter. Accordingly, the clock pulse source 65 was required to deliver a minimum of 256 pulses in 0.008 second (the time in which the piece 10 travels the unit distance of 0.02 inch at two and a half inches per second), which corresponded to a clock pulse frequency of 32.0 kilocycles per second. As will readily be evident, these values of feed rate, number and spacing of brushes, unit feed distance and clock pulse frequency comprise a specific illustrative embodiment of the invention; various other values may be used to suit the requirements at hand.

Figure 2:
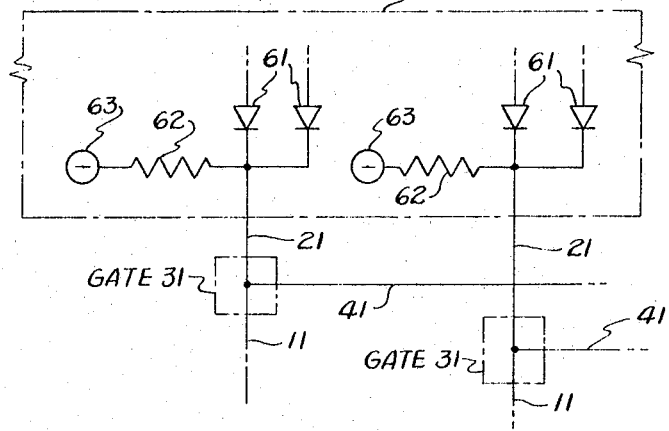
FIG. 2 is a circuit diagram illustrating a representative portion of the commutator block and the gate circuit blocks of FIG. 1.

In FIG. 2 there is illustrated a preferred embodiment of the gate circuits 31. As stated above, the function of each gate circuit 31 is to permit pulses on the associated pulse line 21 to pass to the associated output line 41 only when the associated reading brush 11 is isolated from ground. The pulse lines 21 of FIG. 2 are indicated as being derived from a commutator 60 of the type described in the aforementioned article. Such commutators include a large array of logical AND circuits so arranged as to route different binary signals (from a counter stepped by the clock pulses of source 65) to different pulse lines 21. Assuming that the binary signals employ negative pulses, each pulse line 21 typically is connected to the cathodes of two (or more) rectifiers 61 and a biasing resistor 62. The other ends of the biasing resistors 62 are connected to a supply voltage 63 which is more negative than the negative pulses of the binary signals.

In accordance with the well-known theory of logical AND circuits, both cathodes of the rectifiers 61, and hence also the pulse line 21, are held at ground potential as long as either of the rectifiers 61 receives a binary zero or ground signal as its anode, inasmuch as the ground signal causes that rectifier to conduct with essentially no voltage drop from anode to cathode, the other rectifier thereby being reversed biased for any negative signal on its anode. Further in accordance with known theory, when the binary signal applied to the array of logical AND circuits in the commutator 60 is such as to route negative pulses to both anodes of the pair of rectifiers 61 connected to a pulse line 21, both of the rectifiers 61 tend to conduct and thereby transfer a "commutator pulse" to the pulse line 21.

Connected to each pulse line 21 is an associated output line 41 and an associated reading brush 11, as shown in FIG. 2. By this arrangement, the commutator pulse tending to appear on a pulse line 21 and thereby pass to the associated output line 41 is allowed to appear only if the associated reading brush 11 is isolated from ground, since the reading brush 11 when grounded will hold the cathodes of the rectifiers 61 at ground and thereby reverse bias the rectifiers. Thus, each of the reading brushes 11 is connected as a control input to the logical AND circuit from which its associated pulse line 21 is derived, thereby giving rise to a functional gate circuit 31 between each pulse line 21 and its associated output line 41. The economy of this gating arrangement will be self-evident; however, it is to be understood that it is within the scope of the present invention to employ conventional self-contained gate circuits between the pulse lines 21 and output lines 41 to accomplish the stated gating function.

In measuring the area of the insulative piece 10 of FIG. 1, it may be desirable to omit some portion thereof, such as the portion 10a. This undesired portion 10a may correspond, for example, to a body of water located on a map or aerial photograph piece 10 of which only the land area is to be determined. The undesired portion 10a may easily be omitted from the area measurement provided by the apparatus of FIG. 1 by simply cutting portion 10a out of the piece 10. As will readily be apparent, when the resultant opening passes under the reading brushes 11, it does not isolate any reading brushes from the grounded contact roller 14, and therefore does not cause any commutator pulses on pulse lines 21 to be gated to the counter 46.

If the gate circuits 31 illustrated in FIG. 2 are employed, it is possible to omit the undesired portion 10a on piece 10 by simply coating the portion 10a with electrically-conductive ink, paint or the like. In passing under the reading brushes 11, the resultant conductive spot interconnects adjacent reading brushes such as the two reading brushes 11 indicated in FIG. 2. It will be observed that these reading brushes 11 are directly connected to their associated pulse lines 21. Hence, the pulse lines 21, and the logical AND circuits from which the pulse lines 21 are derived, are also interconnected. It is well known that two (or more) interconnected AND circuits cannot produce an output unless all of the AND circuits simultaneously produce an output. In the operation of the commutator 60, however, only one of the AND circuits can produce an output (commutator) pulse at any given time. Hence, it follows that no commutator pulses can appear on any of the pulse lines 21 which are interconnected by virtue of their associated reading brushes 11 being interconnected by the conductive spot. This feature is especially useful in that a piece 10 coated with a conductive spot (10a) can be "turned over" so that the conductive spot faces the bottom contact roller 14, thereby enabling one to obtain, in two passes of the piece 10 through the rollers 13, 14, the total area of piece 10, and the area of piece 10 less the area of the portion 10a.

Figure 3:
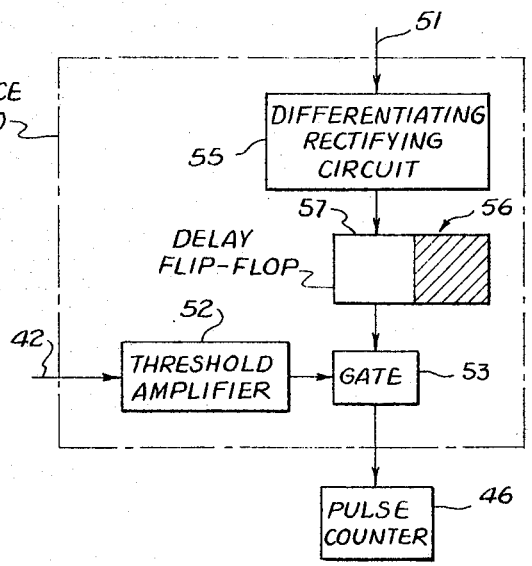
FIG. 3 is a block diagram of the coincidence circuit of FIG. 1.

With reference now to FIGS. 1 and 3, the coincidence circuit 50 will be described. As shown in FIG. 1, the coincidence circuit 50 has connected as inputs thereto the common line 42 and a further line 51. The line 51 is connected to the input of pulse commutator 60 and thus transfers to the coincidence circuit 50 a small portion of every clock pulse applied to commutator 60, while common line 42 (as explained previously) carries those commutator pulses gated by the gate circuits 31. The purpose of coincidence circuit 50 is to check each of the commutator pulses on common line 42 against the clock pulses on line 51 and permit only valid commutator pulses to proceed to the pulse counter 46, pulse counter 46 being connected to the output of coincidence circuit 50.

In FIG. 3 there is illustrated a preferred embodiment of the coincidence circuit 50. The common line 42 is connected to a low-output-impedance amplifier 52 which increases the strength of the commutator pulses carried thereon. In the event that a large number (e.g., 100 or more) of reading brushes 11 are employed, it is usually desirable to incorporate a pulse height discriminating or threshold stage in amplifier 52 to avoid amplifying the low level background noise generated in the large commutator 60 required by the reading brushes. The output of this amplifier 52 is connected to a gate 53.

The line 51 carrying a small part of the clock pulses applied to the commutator 60 is connected to any suitable differentiating-rectifying circuit 55 which differentiates each of the clock pulses into a pair of trigger pulses corresponding to the leading and trailing edges of the clock pulses, the trigger pulses being of opposite polarity and the rectifying portion of the circuit 55 being poled so as to permit only the trigger pulses corresponding to the leading edges of the clock pulses to appear at the output thereof. These leading edge trigger pulses are applied to any suitable delay flip flop 56. Side 57 of this delay flip flop 56 is normally "off"; upon the receipt of a trigger pulse, it is turned "on" and remain "on" for a predetermined delay time, after which it returns to the normally "off" state. The delay time of the delay flip flop 56 is made slightly less than the clock pulse repetition period, i.e., the time between the leading edges of adjacent clock pulses. As a result, side 57 of the delay flip flop 56 is turned "on" by the leading edge of a clock pulse, returns "off" slightly before the leading edge of the next clock pulse, and is promptly turned "on" again. Hence the side 57 is "off" only for a short time just before the end of each of the clock pulse periods.

The output of side 57 is connected to gate 53, gate 53 being opened when side 57 is "off." Consequently, the gate 53 is opened only for a short interval preceding the termination of each of the clock pulse periods. As will readily be appreciated, if a commutator pulse is gated onto the common line 42 by the gate circuits 31, this gated commutator pulse will be present at gate 53 when gate 53 is briefly opened. The gated commutator pulse on common line 42 thus will be allowed to pass to the counter 46. In this manner, the coincidence circuit 50 permits the pulse counter 46 to "look" for commutator pulses on common line 42 only during a small brief interval of each clock pulse repetition period. The brief interval is positioned just ahead of the termination of the clock pulse period, since any commutator pulse gated onto common line 42 normally will be at its maximum amplitude at that position; however, it is within the scope of the present invention to position this "looking" interval in the repetition period wherever the gated commutator pulses on common line 42 may be at their maximum.

As will readily be appreciated, the utilization of the "looking" interval feature provided by the coincidence circuit 50 reduces the possibility of having counter 46 operated by spurious signals on common line 42. Of course, if the number of reading brushes 11 (and therefore the size of the commutator 60) is small, there may be no serious problem with spurious signals on common line 42, in which case the coincidence circuit 50 may be omitted, common line 42 then being connected directly to the counter 46.

Figure 4:
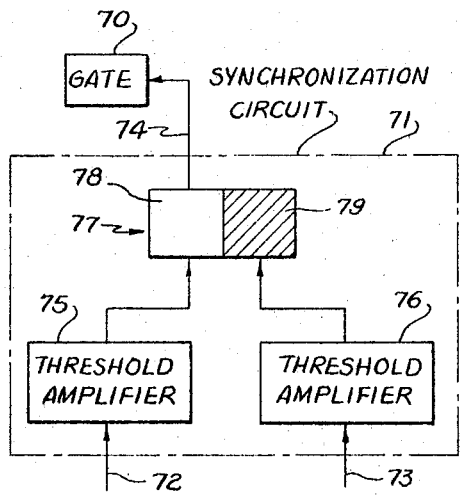
FIG. 4 is a block diagram of the synchronization circuit of FIG. 1.

With reference to FIGS. 1 and 4, the previously-mentioned gate 70 and its associated synchronization circuit 71 and roller rotation sensing means 80 will be described. As was pointed out hereinbefore, the pulse repetition rate of clock pulse source 65 and the speed of motor 17 must be jointly selected to have the source 65 deliver a predetermined number of clock pulses during the time the motor 17 (via the rollers 13, 14) advances the insulative sheet material piece 10 a unit distance. It will be apparent that if the apparatus is to operate reliably, the source 65 and motor 17 should each be stable or drift-free. As is well known, so-called constant frequency pulse sources and constant speed motors are usually many times more costly than their less-constant counterparts. By employing the simple, inexpensive elements 70, 71, and 80 of FIG. 1, it is possible to use an inexpensive pulse source 65 and motor 17 and still achieve reliability in the area measurements provided by the apparatus.

As shown in FIG. 1, the synchronization circuit 71 has connected as input thereto lines 72 and 73. Line 72 comprises one of the last output lines of the commutator 60. Thus, in the example given above wherein the commutator had 256 output lines, 200 of which were used as the pulse lines 21, any of the last few of the remaining 56 output lines of the commutator could be used as the line 72. In this manner, the synchronization circuit 71 receives a commutator pulse every time the commutator 60 receives a complete cycle or predetermined number of clock pulses.

The line 73 is connected to a photoelectric device 81 that is part of the roller rotation sensing means 80. This means also includes any suitable light chopping disc 82 arranged to rotate in synchronism with the rollers 13, 14, as by connection to the drive shaft thereof. The disc 82, which is opaque, has a plurality of slots or transparent windows 83 disposed at angular increments equal to that angle of rotation of rollers 13, 14 which advances the insulative piece 10 a unit distance. The photoelectric device 81, which may be of any suitable type, and a suitable light source 84 are disposed so that the light provided by the light source 84 is chopped by the disc 82 before reaching the photoelectric device 81. In this manner, the line 73 delivers a pulse to the synchronization circuit 71 every time the rollers 13, 14 rotate an amount which advances the piece 10 a unit distance beneath the row of reading brushes 11.

The output of the synchronization circuit 71 is connected via line 74 to the gate 70 interposed between the clock pulse source 65 and commutator 60. In operation, gate 70 is normally opened, allowing clock pulses to reach the commutator 60. When the predetermined number of clock pulses are received by the commutator, the last clock pulse appears on line 72 connected to the synchronization circuit 71. Synchronization circuit 71 then operates to close the gate 70 and prevent any further clock pulses from reaching the commutator 60. This condition is maintained until such time as the synchronization circuit 71 receives a pulse, via line 73, indicating that the piece 10 has been advanced a unit distance. When this latter pulse is received, synchronization circuit 71 operates to re-open the gate 70 to repeat the process. As will readily be appreciated, in the utilization of this synchronizing scheme, the frequency of source 65 and speed of motor 17 are selected so that the source 65 at its lowest expected frequency delivers the predetermined number of clock pulses in less time than the motor 17 at its highest expected speed can advance the piece 10 the unit distance. In other words, the apparatus is adjusted so that the gate 70 closes every unit distance time period to allow the motor 17 to "catch up" to the pulse source 65.

FIG. 4 illustrates a preferred embodiment of the synchronization circuit 71. The input lines 72, 73 are each connected to suitable threshold amplifiers 75, 76 to increase the strengths of the pulses carried thereby. There is provided any suitable flip flop 77 of the two input lead type, amplifier 75 being connected to the input of side 78, and amplifier 76 being connected to the input of side 79 thereof. The output line 74 of the synchronization circuit 71 is derived from side 78. In operation, side 78 is normally in the "off" state, whereby the gate 70 interposed between the source 65 and commutator 60 is normally opened, to allow the clock pulses to proceed to the commutator 60. When line 72 from the commutator 60 receives its commutator pulse, side 78 is turned "on," causing gate 70 to be closed. Then, when the pulse of the photoelectric device 81 is received over line 73, side 78 is again turned "off," gate 70 is again opened, and the cycle is thus completed.

From the foregoing descriptions of the coincidence circuit 50 and synchronizing circuit 71, it will be seen that an apparatus constructed in accordance with the present invention is capable of providing rapid, precise area measurement with a high degree of reliability.

At this point it will further be seen that an apparatus embodying the present invention can measure the areas of a large variety of sizes of the pieces 10. Specifically, it can measure the area of pieces of any length, provided the area thereof does not exceed the capacity of the counter 46. If an unusually large piece is encountered, however, it can be cut into smaller pieces which can then be measured separately and totalled to yield the area of the original piece. The maximum width of piece 10 that can be handled by the apparatus depends on the extent of the row of reading brushes 11 employed. Again, pieces exceeding this dimension can be "sliced" into several narrower strips, the strips can then be processed sequentially, whereupon the total will automatically record, provided that the total may not exceed the counter capacity.

When extremely small pieces 10 are to be measured, it may be difficult to get the pieces into the rollers 13, 14. To overcome this difficulty, each piece may be placed on a piece of conductive sheet material, such as metal foil, which is large enough to be easily inserted into the rollers 13, 14 and thereby carry the insulative piece 10 into the rollers. As will readily be appreciated, the metal foil in lifting various reading brushes 11 from the contact roller 14 does not isolate those brushes from ground and therefore is not sensed by the reading brushes. In this connection, it is to be understood that the reading brushes 11 can sense the insulative property of any sheet material passing therebeneath; that is, the reading brushes 11 can sense the area of a piece of insultative sheet material, or they can sense the area of any insulative substance disposed on a piece of conductive sheet material. The brushes "ignore" any conductive background of an insulative area.

It will be evident that many modifications and variations of the present invention can be effected by those skilled in the art, without departing from the spirit of the invention. For example, many variations of the reading brushes 11 can be constructed to perform the functions thereof. By way of illustration, the reading brushes 11 could be replaced by a row of uniformly-spaced photocells, or by a row of uniformly-spaced optical fibers each connected to a respective photocell. These photocells could face a strip-like light source disposed adjacent the lower roller 14, whereby the opaque property of sheet material pieces could be sensed. That is, either opaque pieces or opaque portions on transparent pieces of sheet material could be passed between the light source and photocells and would prevent light from energizing various photocells, which photocells would be connected to open their associated gate circuits (31) when receiving no light. Alternatively, by disposing the strip-like light source adjacent the top roller 13, the photocells could be arranged to sense the reflectivity of sheet material pieces (i.e., they would sense reflective pieces or reflective portions on non-reflective pieces).

As a final illustration of the sensing or reading elements contemplated by the present invention, an arrangement for sensing conductive pieces or conductive areas on insulative pieces will be briefly described. This arrangement provides a roller for replacing the top roller 13 and reading brushes 11, the new roller consisting of alternately-arranged metallic and insulative discs. Every other metallic disc is contacted on the top thereof by a wiper connected to a reference potential, and the remaining metallic discs are contacted by wipers each connected to an associated gate circuit (31). In this arrangement, the passage of a conductive area beneath the roller composed of the discs causes various ones of the metallic discs connected to the gate circuits to be energized with the reference potential applied to the other metallic discs which are interleaved therewith. The gate circuits would, of course, be arranged to be opened when their associated metallic discs were so energized.

Since these and many other modifications of the invention will be apparent to those skilled in the art, it is intended that the invention not be limited to the exact details of the illustrated embodiment. Rather, it is intended that the invention include all changes and variations which come within the meaning and scope of the appended claim.

What is claimed is:

Apparatus for measuring the area of sheet material, comprising:

a clock pulse source, a first pulse gate having the output of said clock pulse source connected to the input thereof, a pulse commutator having the output of said first pulse gate connected to the input thereof, and having a plurality of output lines, a pulse counter, a row of sheet material sensing elements each arranged to gate the pulses on a respective one of said pulse commutator output lines to said pulse counter when sheet material is sensed thereby, means for feeding sheet material relative to said row of sheet material sensing elements, means for generating a synchronizing pulse every time said sheet material feeding means advances a predetermined unit distance, a two-input flip-flop having one of said pulse commutator output lines connected to one input thereof, and having the output of said synchronizing pulse generating means connected to the other input thereof, the output of said flip-flop being connected to the control input of said first pulse gate, so that said first pulse gate is closed in response to a pulse on said one pulse commutator output line and opened in response to a synchronizing pulse from said synchronizing pulse generating means, a buffer having a plurality of inputs each connected to a respective one of said sheet material sensing elements and the pulse commutator output line associated therewith, said buffer further having a common output line, a second pulse gate having said buffer common output line connected to the input thereof, the output of said second pulse gate being connected to the input of said pulse counter, a differentiating-rectifying circuit having the output of said first pulse gate connected to the input thereof, and a delay flip-flop having the output of said differentiating-rectifying circuit connected to the input thereof so that said delay flip-flop is flipped by the leading edge of a clock pulse passed by said first pulse gate, said delay flip-flop returning to its original state before the leading edge of the succeeding clock pulse, the output of said delay flip-flop being connected to the control input of said second pulse gate so that said second pulse gate is opened only for a short time at the end of each clock pulse period.

References Cited by the Examiner

UNITED STATES PATENTS

| | | | |
|---|---|---|---|
| 730,491 | 6/1903 | Thomson | 33—123 |
| 2,346,031 | 4/1944 | Jones et al. | |
| 2,356,761 | 8/1944 | Jones et al. | |
| 2,756,627 | 7/1956 | Boycks | 33—123 X |
| 3,063,632 | 11/1962 | Stringer et al. | 235—92 |
| 3,194,948 | 7/1965 | Alexander et al. | 33—1 X |

FOREIGN PATENTS 77,339    6/1957    Great Britain.

ROBERT B. HULL, *Primary Examiner.*

ISAAC LISANN, *Examiner.*